United States Patent
Musslin et al.

(10) Patent No.: US 7,645,391 B2
(45) Date of Patent: Jan. 12, 2010

(54) SUPPLY DEVICE FOR ULTRAVIOLET LAMPS USED IN THE TREATMENT OF WATER

(75) Inventors: Jean-Marie Musslin, Bitschwiller-les-Thann (FR); Noel Risch, Ebersheim (FR); Pierre Girodet, Asnieres (FR); Vanpeene Christian, Villejuif (FR)

(73) Assignee: OTV S.A., Saint-Maurice (FR)

( * ) Notice: Subject to any disclaimer, the term of this patent is extended or adjusted under 35 U.S.C. 154(b) by 203 days.

(21) Appl. No.: 10/583,702

(22) PCT Filed: Dec. 7, 2004

(86) PCT No.: PCT/FR2004/003145

§ 371 (c)(1),
(2), (4) Date: Jul. 6, 2007

(87) PCT Pub. No.: WO2005/070834

PCT Pub. Date: Aug. 4, 2005

(65) Prior Publication Data

US 2007/0251886 A1    Nov. 1, 2007

(30) Foreign Application Priority Data

Dec. 23, 2003   (FR) .................................. 03 15343

(51) Int. Cl.
*C02F 1/32* (2006.01)
*C02F 1/00* (2006.01)

(52) U.S. Cl. ..................... 210/748; 250/428
(58) Field of Classification Search ................ 210/748; 250/428

See application file for complete search history.

(56) References Cited

U.S. PATENT DOCUMENTS

| 5,368,826 | A | 11/1994 | Weltz et al. |
| 6,181,076 | B1 * | 1/2001 | Trestman et al. ............. 315/224 |
| 6,593,704 | B2 * | 7/2003 | Riepe et al. .................. 315/224 |
| 2002/0101185 | A1 | 8/2002 | Kozlowski |
| 2003/0015478 | A1 * | 1/2003 | Kuennen et al. ............ 210/748 |
| 2003/0214257 | A1 | 11/2003 | Baarman |

* cited by examiner

*Primary Examiner*—Walter D Griffin
*Assistant Examiner*—Cameron J Allen
(74) *Attorney, Agent, or Firm*—Coats & Bennett, P.L.L.C.

(57) ABSTRACT

A device for disinfecting water by ultraviolet radiation. The device includes two discharged lamps that are connected by electrical wires. A first electrical circuit is disposed in the immediate vicinity of the discharge lamps and controls a warm-up phase of the discharge lamps. A second electrical circuit is disposed remotely from the discharge lamps and functions to control an operational phase of the discharge lamps.

24 Claims, 2 Drawing Sheets

SUPPLY DEVICE FOR ULTRAVIOLET LAMPS USED IN THE TREATMENT OF WATER

This application is a U.S. National Stage application of PCT Application No. PCT/FR04/03145, with an international filing date of Dec. 7, 2004. Application claims priority based on French application serial no. 03 15343 filed Dec. 23, 2003.

The invention relates to the domain of water treatment, both for purification processes and for processes to create drinking water.

More precisely, the invention relates to water treatment by ultraviolet radiation using UV lamps.

UV lamps are routinely used in water treatment installations dedicated to making water suitable for drinking or purification.

Thus, such lamps are frequently used in water disinfection units integrated into drinking water plants. Microorganisms such as viruses and bacteria are deactivated or destroyed under the photochemical effect provoked by ultraviolet radiation at some wavelengths.

These UV lamps are also used in dechlorination units since the energy that they dispense encourages the appearance of chemical species capable of transforming the chlorinated species present in the water.

Such UV lamps can be used in open channels or in closed reaction vessels, usually made of stainless steel, in which the water to be treated circulates and in which the lamps are completely immersed.

One or several banks of lamps dispense ultraviolet radiation with a wavelength of between 200 nm and 300 nm, usually 254 nm, and are usually provided in the channels. These banks may be organised into modules that are frequently parallel to each other. Each module is composed of one or several series of UV lamps protected by quartz jackets.

UV lamps used for water treatment are connected through electrical cables to power supply means comprising:
lamp warming up and ignition means; and
means of assuring normal UV irradiation of the lamps.

Those skilled in the art refer to these power supply means as "ballast". Ballasts were originally entirely passive and now consist of an electronic converter raising the low frequency of the power supply voltage to a frequency of 20 to 80 kHz. The electronic ballast can be used for different purposes, including adjusting the power supplied to the lamps.

This ballast is installed at a distance from the lamps themselves and is connected to them through electrical cables.

When using such devices for water treatment, the ballast of the lamps must be placed out of the water in an electrical cabinet that is leak tight or made leak tight for example using resins.

Each cable connecting lamps to the ballast is thus long.

Each UV lamp is connected to the ballast by 4 electrical wires to be able to manage the following independently:
the warming up phase of the lamps
the operating phase during normal irradiation mode.

During the warming up phase, the quantity of current that passes through the electrodes does not cause ionisation of the plasma contained in them. This warming up phase is followed by ignition of the lamps during which a voltage peak is sent to the lamps to achieve a first ionisation due to a variation in the frequency of the ballast to pass through a resonance peak. The lamps then operate in normal UV irradiation mode in which the four connections manage the quantity of current passing from one electrode to another in the plasma as a function of the frequency of the electrical generator, and this causes the emission of UV photons by the lamps.

Some manufacturers thought of supplying power to two UV lamps from a single ballast, so as to increase the competitiveness of their product. Before this application can be economically attractive, these lamps must be installed in series or partially in series. The installation of two lamps in parallel increases the number of electrical components and is practically equivalent to making two ballasts on the electronic card with a single ballast. The installation of the two lamps in series enables power supply of the two lamps installed in series without any major modification to the electrical components making up the ballast used to supply power to a single UV lamp simply by increasing the voltage applied to their terminal by a factor of two. This simplification results in corresponding savings.

However, existing power supply systems for several UV lamps in series still use four conducting wires per lamp. Even when the lamps are connected in series, the need to control the warming up current and the arc current so as to enable good management of the different cycles imposes wiring with 6 to 8 wires between the ballast and the two lamps in series. Electromagnetic shielding means are associated with these conducting wires.

One disadvantage of the technique according to prior art is the relatively high cost of using 6 to 8 conductors per ballast, and associated shielding.

Another disadvantage of this technique according to prior art is that it limits the connection distance between the ballast and the lamps to a maximum of 15 m. When the connection distance between the ballast and the lamps increases, the impedance of the cables is no longer negligible compared with the impedance of the resonant ballast power supply circuit, which prevents the lamps from operating correctly. Furthermore, parasite capacitances between the wires proportional to the length of the conducting wires then affect correct operation of the ballast and create asymmetries in the lamp power supply.

Another disadvantage of this technique for devices using UV lamps for water treatment results from the need to protect the ballast from water when the ballast is close to water. The reduction in the wiring length of the lamps makes it necessary to bring the ballasts close to the lamps and therefore to the water which makes it necessary either to make the ballasts or the electrical cabinets or boxes containing the ballasts leak tight. Another result is difficulties in use and cost increases.

Another disadvantage of this technique according to prior art is the energy loss associated with the use of long conducting wires, related essentially due to their non-negligible impedance.

In particular, the purpose of the invention is to propose a device for overcoming these disadvantages according to prior art.

One purpose of the invention is to propose a simple device less expensive to implement.

Another purpose of the invention is to propose a device to facilitate making the lamps operate "symmetrically", particularly when the lamps are warming up.

Another purpose of the invention is to provide a device for increasing the length of connection cables between the ballast and the UV lamps, without altering their operation.

Another purpose of the invention is to provide a water disinfection device by ultraviolet radiation using the electrical power supply for at least two UV lamps with a single ballast with a better global electrical efficiency.

These and other advantages that will appear later are achieved using a water disinfection device by ultraviolet radiation comprising at least two discharge lamps connected by electrical wires to power supply means comprising:

lamp warming up and ignition means; and means of achieving normal operation of the lamps, characterised in that at least one of the electrical components of the said warming up means is provided in the immediate vicinity of the said lamps, the other components of the said power supply means being provided at a distance from them.

According to the invention, at least one of the electrical components participating in warming up of the said lamps is located close to the lamps.

Thus, the invention is based on a novel and inventive approach consisting of locating some of the components of the power supply means participating in warming up close to the lamps, and placing the other components of the power supply means at a distance from these lamps.

In the state of the art, these components are entirely integrated in the ballast, away from the lamps.

Such a configuration can reduce the number of conductors between the ballast and the lamps to only two, and thus reduce the impedance of the wiring for equivalent length without it being necessary to make the ballast or the electrical cabinet containing the ballast leak tight. It also reduces lamp power supply asymmetries due to parasite capacitances. As a result, significantly greater cable lengths are possible (up to 30 m) than were possible in the past. This configuration makes it possible to use the device at lower cost and to obtain a better electrical efficiency.

Note that within the scope of this invention, the expression "in the immediate vicinity" refers to a distance of less than 0.5 m, and the expression "at a distance" means a distance of more than 2 m.

According to a first variant of the invention, the said lamp warming up and ignition means include electrical components for warming up current controlled lamps.

According to a second variant of the invention, the said lamp warming up and ignition means include electrical components for voltage controlled warming up of the lamps.

The lamps can be assembled in two different modes, for the first and second variants:

a mode in which the said at least two lamps of the device are installed in series;

a mode in which the said at least two lamps of the device are installed in parallel.

For a device comprising two lamps, such configurations make it possible to use wiring with two conducting wires (installation in series) or 3 conducting wires (installation in parallel).

It will be seen that in the case of a device comprising a number n of lamps mounted in parallel, the wiring comprises a number (n+1) of conducting wires.

On the other hand, in the case of a device comprising an installation of lamps in series, this enables the use of wiring with two conducting wires only, regardless of the number of lamps. Therefore, this configuration can be used advantageously if there is a large number of lamps powered by a single ballast.

With reference to these different variants, one of the components in the immediate vicinity of the lamps includes a capacitor or a transformer.

Advantageously, the components provided in the immediate vicinity of the lamps may be placed in a leak tight box. This very compact box may possibly be placed in or immediately behind the lamp socket.

According to these different variants, the lamps may be UV lamps, preferably mercury vapour lamps. Obviously, other types of UV lamps can be used. However, it will be understood that the invention can be applied to any other type of discharge lamp requiring warming up.

The invention also covers any water disinfection installation by ultraviolet radiation comprising at least one device like that described above.

Other special features and advantages of the invention will become clearer after reading the following description of a preferred embodiment given as a simple and non-limitative example, and the appended figures, wherein.

Figure 1:
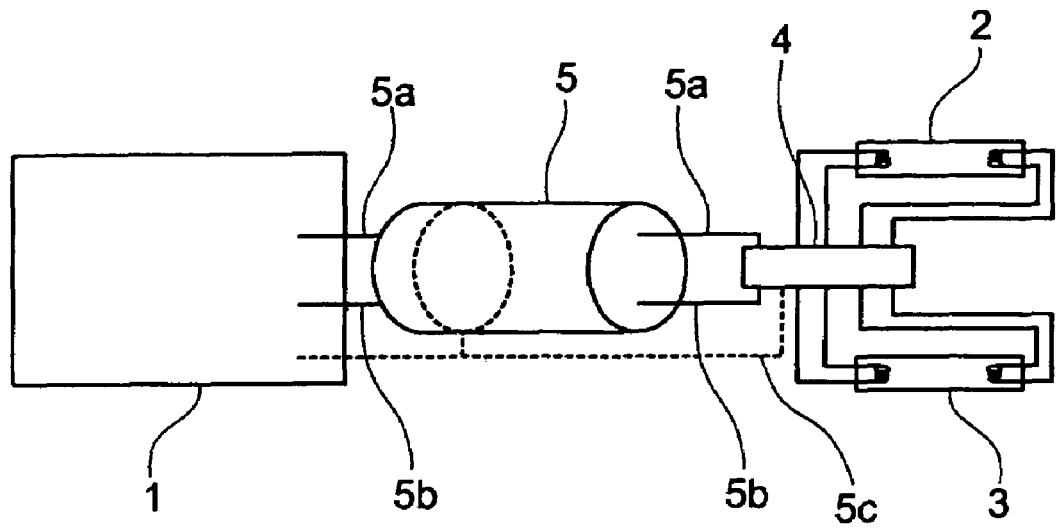
FIG. 1 shows a block diagram of the device according to this invention.

With reference to FIG. 1, the device includes a "ballast" 1, two UV lamps 2, 3 mounted in series and a cable 5, that can be as long as 30 m connecting the ballast 1 to these UV lamps. Each of these lamps 2, 3 has four connectors.

According to this invention, the warming up means 4 of the lamps 2, 3 are provided in the immediate vicinity of the lamps. Thus, the cable 5 is composed of only two conducting wires $5a$ and $5b$, and possibly also shielding shown in dashed lines.

Figure 2:
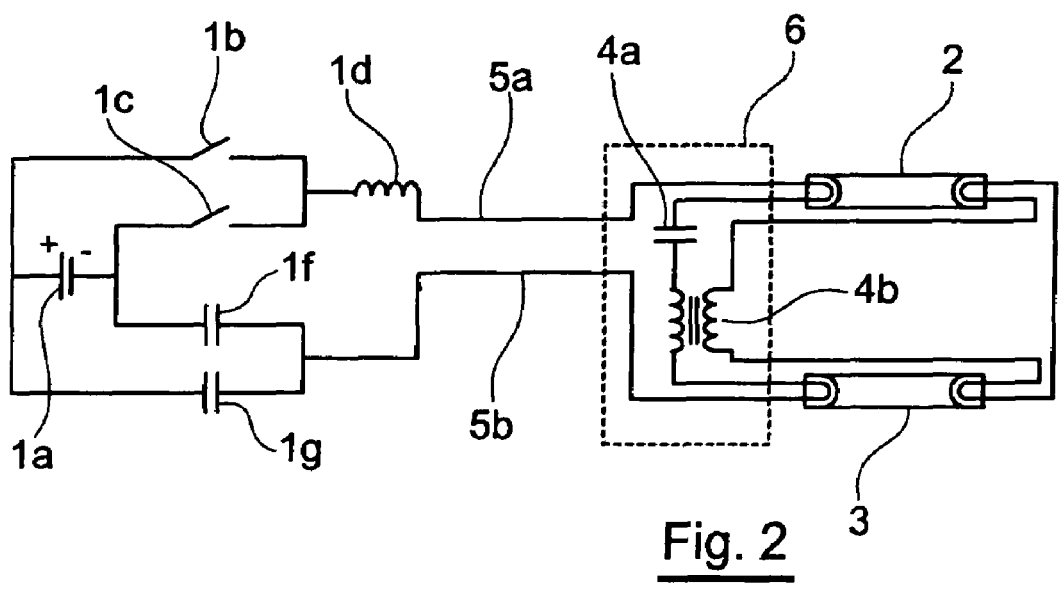
FIG. 2 illustrates an operating mode with current controlled warming up in the case of series assembly of lamps according to FIG. 1.

FIG. 2 shows the electrical diagram corresponding to a device shown in FIG. 1 according to which the components of the electrical power supply provided in the immediate vicinity of the lamps warm up the lamps in a current controlled remote mode.

According to this Figure, the ballast 1 comprises an electronic converter $1a$ outputting a square signal by means of two switches $1b$, $1c$, with variable frequency control, a coil (also called an inductance) $1d$ for regulation of the current and two capacitors $1f$, $1g$.

The electrical power supply components provided in the immediate vicinity of the lamps form a module 6 and comprise at least one capacitor $4a$ and one transformer $4d$.

The module 6 is connected to the ballast 1 through the two conducting wires $5a$, $5b$. Compared with prior art, the number of conducting wires between the ballast and the lamps mounted in series is thus reduced by a factor of three or four, limiting parasite capacitances and inductances of wiring and their relative influence on correct operation of the ballast and the lamps. Consequently, this configuration can reduce energy costs and the costs of using the device, while making it possible to have very much longer cables.

Figure 3:
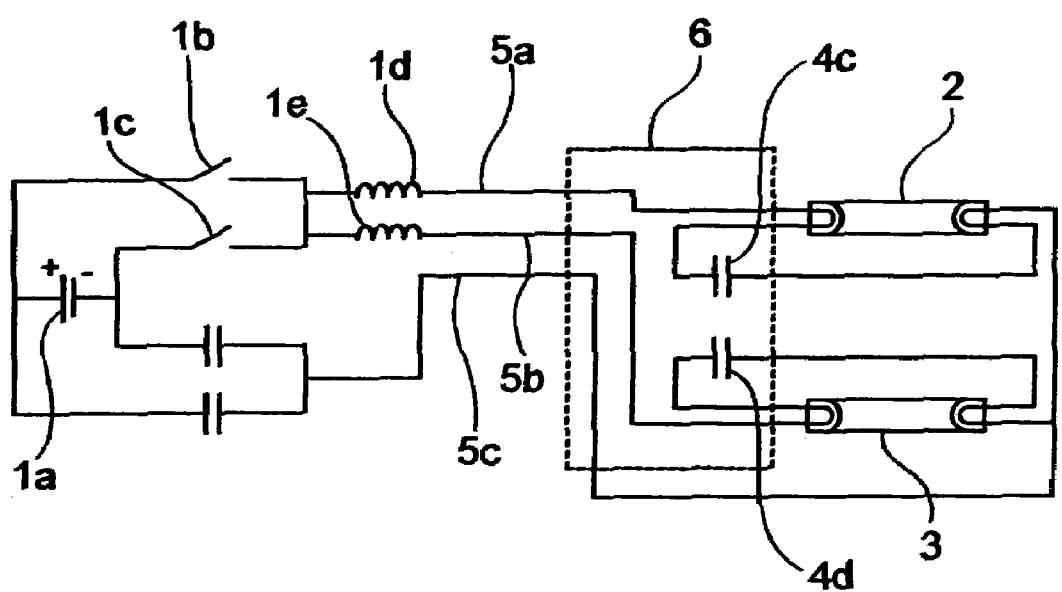
FIG. 3 illustrates an operating mode with current controlled warming up in the case of parallel installation of the lamps.

FIG. 3 illustrates the electrical diagram for another embodiment of a device according to the invention in which the lamps 2, 3 are installed in parallel, still using current controlled warming up.

In this embodiment, the ballast 1 comprises an electrical generator $1a$, two switches $1b$, $1c$, two coils $1d$, $1e$ and two capacitors $1f$, $1g$.

Components participating in warming up provided in the immediate vicinity of the lamps are all included in a module 6 and comprise two capacitors $4c$, $4d$.

According to this embodiment, the number of conducting wires $5a$, $5b$, $5c$ connecting lamps to the ballast 1 is reduced to 3.

In both embodiments described above, the module 6 is very small and may be placed in or immediately behind the lamp socket.

According to this invention, other embodiments could be envisaged.

In particular, lamps may be warmed up by means of electrical components capable of voltage controlled warming up.

Obviously, the device may contain more than two discharge lamps.

These discharge lamps may be mounted in series, or in parallel or in a series and parallel assembly.

The invention claimed is:

1. A water treatment device comprising:
   at least two discharge lamps for photo-chemically treating water;
   a first electrical circuit disposed in the immediate vicinity of the discharge lamps and electrically connected to the discharge lamps, wherein the first electrical circuit is configured to control a warm up phase of the discharge lamps; and
   a second electrical circuit disposed remotely from the discharge lamps and electrically connected to the first electrical circuit, wherein the second electrical circuit is configured to control an operational phase of the discharge lamps.

2. The water treatment device of claim 1 wherein at least two of the two or more discharge lamps are connected in series.

3. The water treatment device of claim 1 wherein at least two of the two or more discharge lamps are connected in parallel.

4. The water treatment device of claim 1 wherein the first electrical circuit comprises at least one capacitor electrically connected to at least one transformer.

5. The water treatment device of claim 1 wherein the first electrical circuit is disposed immediately adjacent to the discharge lamps.

6. The water treatment device of claim 1 wherein the discharge lamps comprise ultraviolet discharge lamps.

7. The water treatment device of claim 1 wherein the discharge lamps comprise mercury vapor discharge lamps.

8. The water treatment device of claim 1 wherein the first electrical circuit generates a voltage control signal, and wherein the voltage control signal controls the warm up phase of the discharge lamps.

9. The water treatment device of claim 1 wherein the first electrical circuit generates a current control signal, and wherein the current control signal controls the warm up phase of the discharge lamps.

10. A method of photo-chemically treating water with two or more discharge lamps, the method comprising:
    controlling a warm up phase associated with the two or more discharge lamps with a first electrical circuit disposed in the immediate vicinity of the discharge lamps; and
    controlling an operational phase associated with the two or more discharge lamps with a second electrical circuit disposed remotely from the discharge lamps.

11. The method of claim 10 wherein the two or more discharge lamps are connected in series.

12. The method of claim 10 wherein the two or more discharge lamps are connected in parallel.

13. The method of claim 10 wherein the two or more discharge lamps comprise two or more ultraviolet discharge lamps.

14. A water treatment device comprising:
    two or more ultraviolet discharge lamps;
    a first electrical circuit disposed a first distance from the ultraviolet discharge lamps, wherein the first electrical circuit is configured to control a warm up phase of the discharge lamps;
    a second electrical circuit disposed a second distance from the ultraviolet discharge lamps, wherein the second distance is greater than the first distance, and wherein the second electrical circuit is configured to control an operational phase of the discharge lamps; and
    wherein the first electrical circuit is disposed less than 0.5 meters from the two or more ultraviolet discharge lamps and wherein the second electrical circuit is disposed at least 2.0 meters from the ultraviolet discharge lamps.

15. The water treatment device of claim 14 wherein the first distance comprises a relatively small distance, and wherein the second distance comprises a relatively large distance.

16. The water treatment device of claim 15 wherein the first distance is generally less than 0.5 meters, and wherein the second distance is generally greater than 2 meters.

17. The water treatment device of claim 14 wherein the first and second electrical circuits are separated by at least 1.5 meters.

18. The water treatment device of claim 14 wherein at least two of the two or more ultraviolet discharge lamps are connected in series.

19. The water treatment device of claim 14 wherein at least two of the two or more ultraviolet discharge lamps are connected in parallel.

20. The water treatment device of claim 2 wherein the first electrical circuit is disposed less than 0.5 meters from at least one of the discharged lamps and includes a first capacitor in series with a transformer; wherein the second electrical circuit is disposed at least two meters from both discharge lamps and includes a power supply, a second capacitor in series with a first switch and a third capacitor in series with a second switch, and an inductor in series with the second and third capacitors and the first and second switches.

21. The water treatment device of claim 20 including only two wires interconnecting the first electrical circuit with the second electrical circuit.

22. The water treatment device of claim 3 wherein the first electrical circuit is disposed less than 0.5 meters from one of the discharge lamps and include first and second capacitors; and wherein the second electrical circuit is disposed at least 2.0 meters from the discharge lamps and includes a power supply and a third capacitor in series with a first switch and a fourth capacitor in series with a second switch, and two parallel inductors disposed in series with the third and fourth capacitors and first and second switches.

23. The water treatment device of claim 22 including only three wires interconnecting the first and second electrical circuits.

24. The method of claim 10 including placing the first electrical circuit within 0.5 meters of the discharge lamps, and placing the second electrical circuit at least 2.0 meters from the discharge lamps.

* * * * *

UNITED STATES PATENT AND TRADEMARK OFFICE
CERTIFICATE OF CORRECTION

| | |
|---|---|
| PATENT NO. | : 7,645,391 B2 |
| APPLICATION NO. | : 10/583702 |
| DATED | : January 12, 2010 |
| INVENTOR(S) | : Musslin et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 18 days.

Signed and Sealed this

Sixteenth Day of November, 2010

David J. Kappos
*Director of the United States Patent and Trademark Office*